United States Patent
Cams et al.

(10) Patent No.: US 10,268,012 B2
(45) Date of Patent: Apr. 23, 2019

(54) THERMALLY CONDUCTIVE CLOSURE FOR ELECTRONICS

(71) Applicants: CommScope Connectivity UK Limited, Dorcan, Swindon, Wiltshire (GB); CommScope Connectivity Belgium BVBA, Kessel-Lo (BE)

(72) Inventors: Eddy Luc Cams, Bilzen (BE); Nicolas De Jaegere, Schilde (BE); Patrick Jacques Ann Diepstraten, Heusden-Zolder (BE); Ian Miles Standish, Flintshire (GB)

(73) Assignees: CommScope Connectivity UK Limited (GB); CommScope Connectivity Belgium BVBA (BE)

( * ) Notice: Subject to any disclaimer, the term of this patent is extended or adjusted under 35 U.S.C. 154(b) by 0 days.

(21) Appl. No.: 15/559,756

(22) PCT Filed: Mar. 18, 2016

(86) PCT No.: PCT/EP2016/056067
§ 371 (c)(1),
(2) Date: Sep. 19, 2017

(87) PCT Pub. No.: WO2016/146848
PCT Pub. Date: Sep. 22, 2016

(65) Prior Publication Data
US 2018/0045906 A1 Feb. 15, 2018

Related U.S. Application Data

(60) Provisional application No. 62/135,478, filed on Mar. 19, 2015.

(51) Int. Cl.
*G02B 6/44* (2006.01)
*H01R 12/75* (2011.01)
(Continued)

(52) U.S. Cl.
CPC ......... *G02B 6/4448* (2013.01); *G02B 6/4248* (2013.01); *G02B 6/4269* (2013.01);
(Continued)

(58) Field of Classification Search
CPC .. G02B 6/4448; G02B 6/4416; G02B 6/4478; G02B 6/4269; G02B 6/4248;
(Continued)

(56) References Cited

U.S. PATENT DOCUMENTS

| 5,946,193 A * | 8/1999 | Hendrix | ............. | H05K 7/20545 165/104.33 |
| 6,796,821 B2 * | 9/2004 | Cairns | ................ | G02B 6/4428 439/204 |

(Continued)

FOREIGN PATENT DOCUMENTS

FR 2 956 558 A1 8/2011
JP 2005-024760 A 1/2005
(Continued)

OTHER PUBLICATIONS

International Search Report and Written Opinion of the International Searching Authority for corresponding International Patent Application No. PCT/EP2016/056067 dated Oct. 7, 2016, 16 pages.

*Primary Examiner* — Ryan A Lepisto
(74) *Attorney, Agent, or Firm* — Merchant & Gould P.C.

(57) ABSTRACT

A closure (100) facilitates upgrading a network to extend optical fibers closer to, or all the way to, the subscribers by facilitating the transition between optical signals to electrical signals. The closure includes a base (110) and a cover (120) defining an interior; and a circuit board (130) disposed within the interior. A management tray (140) can be coupled to the base. The circuit board (130) includes the optoelectronic circuitry. The management tray (140) includes a platform (141) disposed between the circuit board (130) and the cover (120). Various types of fiber and electrical cable sub-assemblies (160) can be received at a port (113) defined in the closure.

27 Claims, 16 Drawing Sheets

(51) Int. Cl.
  *H01R 13/52* (2006.01)
  *G02B 6/42* (2006.01)
  *H01R 13/56* (2006.01)
  *H01R 13/6463* (2011.01)

(52) U.S. Cl.
  CPC .......... *G02B 6/443* (2013.01); *G02B 6/4416* (2013.01); *G02B 6/4478* (2013.01); *H01R 12/75* (2013.01); *H01R 13/521* (2013.01); *H01R 13/5202* (2013.01); *H01R 13/5205* (2013.01); *H01R 13/562* (2013.01); *H01R 13/6463* (2013.01)

(58) Field of Classification Search
  CPC .... G02B 6/443; H01R 13/562; H01R 13/521; H01R 13/5205; H01R 13/6463; H01R 13/5202; H01R 12/75
  See application file for complete search history.

(56) References Cited

U.S. PATENT DOCUMENTS

| | | | |
|---|---|---|---|
| 9,557,505 B2* | 1/2017 | Huegerich | G02B 6/4448 |
| 2003/0131973 A1* | 7/2003 | Nair | F28F 3/04 |
| | | | 165/104.33 |
| 2005/0152118 A1* | 7/2005 | Cho | G06F 1/20 |
| | | | 361/707 |
| 2008/0131132 A1 | 6/2008 | Solheid et al. | |
| 2011/0317346 A1 | 12/2011 | Kang et al. | |

FOREIGN PATENT DOCUMENTS

| | | |
|---|---|---|
| JP | 2007-214556 A | 8/2007 |
| JP | 2009-198603 A | 9/2009 |
| JP | 2010-238706 A | 10/2010 |
| WO | 2014/167447 | 10/2014 |

\* cited by examiner

THERMALLY CONDUCTIVE CLOSURE FOR ELECTRONICS

CROSS-REFERENCE TO RELATED APPLICATION

This application is a National Stage Application of PCT/EP2016/056067, filed on Mar. 18, 2016, which claims the benefit of U.S. Patent Application Ser. No. 62/135,478, filed on Mar. 19, 2015, the disclosures of which are incorporated herein by reference in their entireties. To the extent appropriate, a claim of priority is made to each of the above disclosed applications.

BACKGROUND

Fiber to the distribution point (FTTdp) is a fiber-optic based communication delivery network in which optical fibers are run in an optical distribution network from a central office to locations (i.e., distribution points) located near subscribers. Electrical cables complete the network, extending from the distribution points to the subscribers (e.g., to Optical Network Terminals or other subscriber equipment). The optical signals carried by the optical fibers are converted into electrical signals, which are carried by the electrical cables the remaining distance to the subscribers.

Improvements are desired.

SUMMARY

The present disclosure provides a system and method that facilitates the transition between optical signals to electrical signals in the field. The present disclosure also facilitates upgrading the network to extend the fibers closer to, or all the way to, the premises.

In accordance with some aspects of the disclosure, a closure for optoelectronic circuitry includes a base; a cover that attaches to the base to close an interior of the closure; and a circuit board disposed within the interior of the closure. The base has a sidewall extending upwardly from a bottom, the sidewall defining a cable port. The circuit board includes the optoelectronic circuitry.

In certain implementations, a management tray is disposed within the closure. The management tray includes a platform disposed between the circuit board and the cover. The management tray includes a fiber coupling region and a fiber storage region.

In certain implementations, cooling structures disposed on at least one of the base and the cover. In certain examples, the cooling structures are disposed on both the base and the cover. In certain examples, the cooling structures include elongated fins. In certain examples, the cooling structures include raised square structures. In certain examples, the cooling structures include raised pyramids.

In certain implementations, the management tray includes a guide entrance that faces in a different direction from a guide exit.

In certain implementations, the management tray includes guides sized to enable electrical conductors to be routed therethrough. In certain examples, the guides are disposed at an opposite major surface of the management tray from the coupling region and storage region.

In certain implementations, an optical adapter is disposed at the coupling region of the management tray. In certain implementations, the coupling region also is configured to receive and retain a splice holder.

In certain implementations, the platform defines apertures sized to accommodate components on the circuit board.

In certain implementations, a cable sub-assembly is configured to be secured at the cable port of the closure. The cable sub-assembly includes an optical fiber cable and an electrical cable. In certain examples, the cable sub-assembly includes a plurality of electrical cables.

In certain implementations, cooling pads are disposed at the bottom of the base.

In accordance with some aspects of the disclosure, a cable sub-assembly includes an optical fiber cable; a plurality of electrical cables; and a sealing arrangement disposed over a portion of the cables. The optical fiber cable includes an optical fiber within a jacket. The electrical cables include twisted pair conductors within jackets. The sealing arrangement is configured to seal between the cable jackets and a cable port of a closure to which the cable sub-assembly is mounted. In certain examples, the connector also is configured to seal an interior of at least one of the optical and electrical cables.

In certain implementations, the body of the sealing arrangement includes a first clamping member and a second clamping member to hold the gasket therebetween. In certain examples, the second clamping member carries an external O-ring. In certain examples, the first and second clamping members are fastened together. In certain examples, the sealing arrangement also includes a boot that provides bend control for the cables.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

In general, the disclosure relates to closure holding electronic circuitry to convert between optical signals and electrical signals (i.e., conversion circuitry). The closure is configured to receive both an optical fiber carrying the optical signals and an electrical conductor carrying the electrical signals. The closure is configured to disperse heat generated by the electronic circuitry. The closure also is configured to environmentally seal (e.g., a water-tight seal, a vapor-tight seal, etc.) the electronic circuitry from an external environment. The closure also is configured to guide and organize optical fibers within the closure while maintaining distance between the optical fibers and the electronic circuitry.

Figure 1:
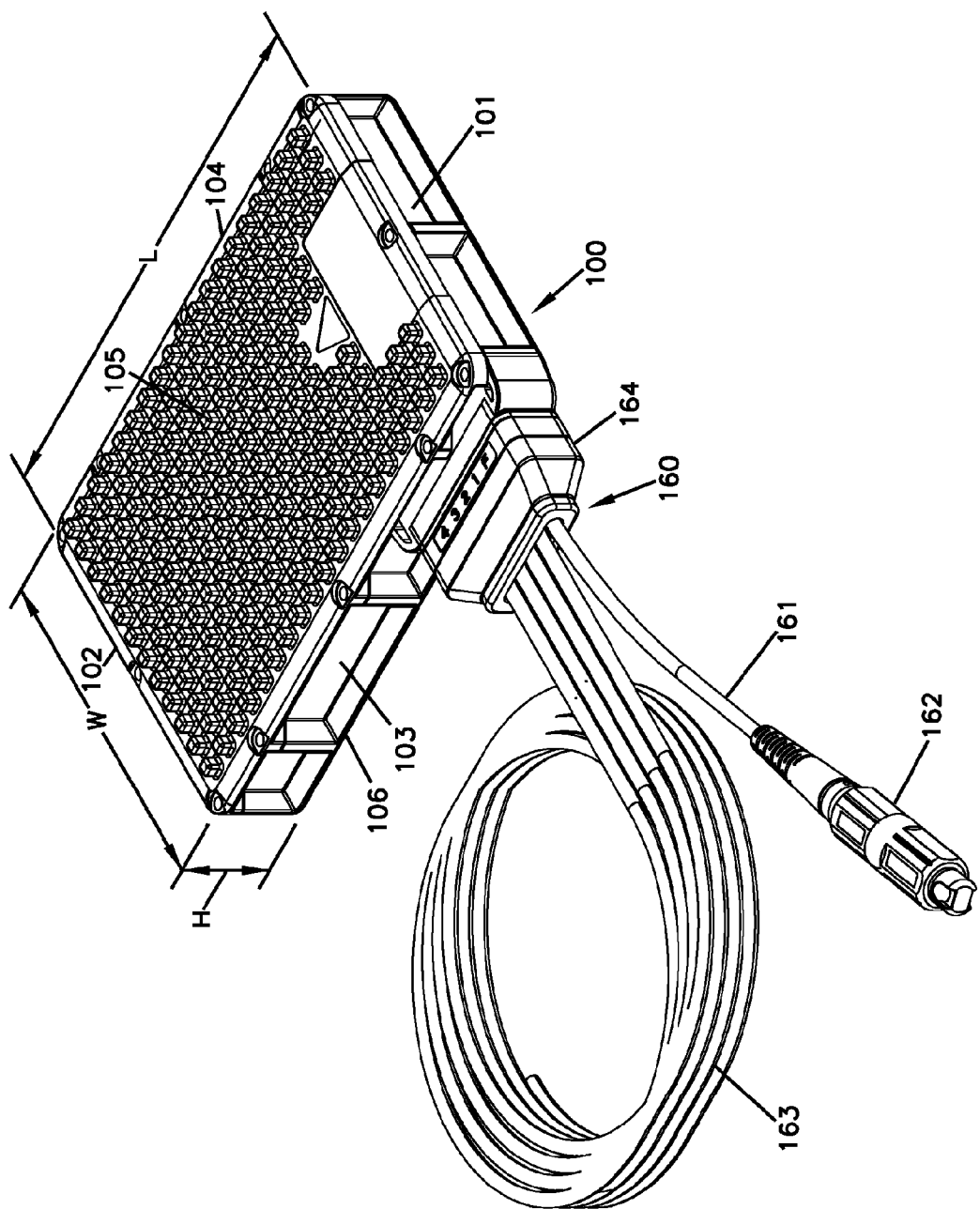
FIG. 1 is a perspective view of an example cable sub-assembly received at an example closure configured in accordance with the principles of the present disclosure.

FIG. 1 illustrates an example closure 100 holding the conversion circuitry. The closure 100 extends along a length L between a first end 101 and a second end 102, extends along a width W between a first side 103 and a second side 104, and along a height H between a top 105 and a bottom 106. The closure 100 defines an interior in which the conversion circuitry is disposed. The closure 100 includes a base 110 and a cover 120 that cooperate to define the interior 107. In the example shown, the base 110 includes a sidewall 112 extend upwardly from a bottom 111 and the cover 120 attaches to the sidewall 112 opposite the bottom 111.

A cable sub-assembly 160 is routed into a closure through a port 113 and sealed with a sealing arrangement 164. In certain implementations, the sealing arrangement 164 can be secured to the closure 100 (e.g., using fasteners, latches, or other securement structure). In some implementations, the cable sub-assembly 160 includes an optical fiber and an electrical conductor. In certain implementations, the cable sub-assembly 160 includes an optical fiber cable 161 that includes at least one optical fiber 161a and an electrical cable 163 that includes an electrical conductor. In certain examples, the optical fiber cable 161 includes a plurality of optical fibers. In certain examples, the optical fiber cable has a distal end remote from the first end that is terminated at an optical connector (e.g., a single fiber connector, such as an LC connector, an SC connector, and an LX.5 connector, or a multi-fiber connector, such as an MPO connector and an HMFOC connector). In certain examples, the electrical cable has a distal end that is remote from the first end and is unterminated.

Electronic circuitry can be disposed within the interior 107. In certain implementations, the electronic circuitry is configured to convert between optical signals and electrical signals. In such implementations, optical signals carried over the optical fiber cable 161 of the cable sub-assembly 160 can be converted to electrical signals by the electronic circuitry and the electrical signals can be carried over the electrical conductor(s) of the cable sub-assembly 160. Accordingly, signals carried between a central office and a subscriber can be carried over optical fibers along a majority of the network and carried over electrical conductors only over short distances between the closure 100 and the subscriber.

Figure 2:
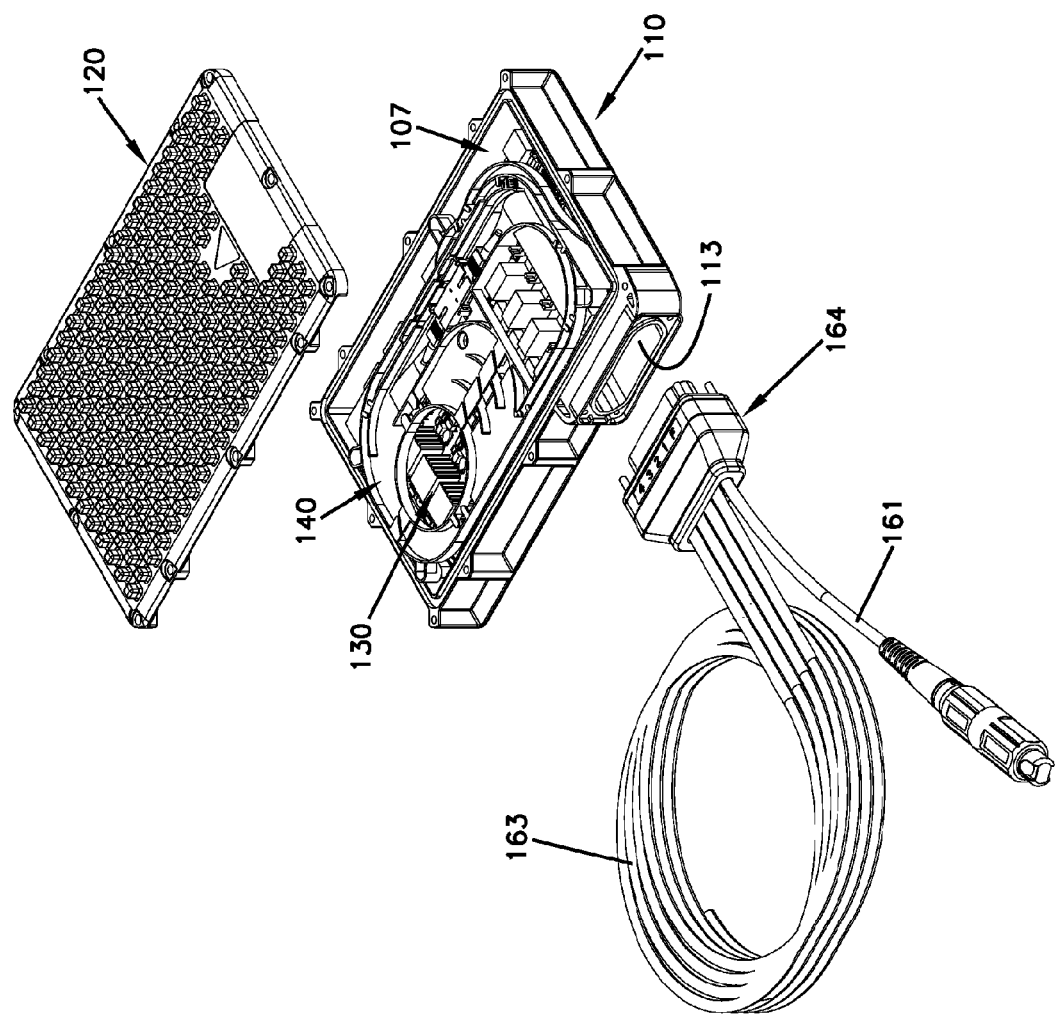
FIG. 2 shows the cable sub-assembly exploded outwardly from the closure of FIG. 1 and a cover of the closure exploded outwardly from a base.
Figure 3:
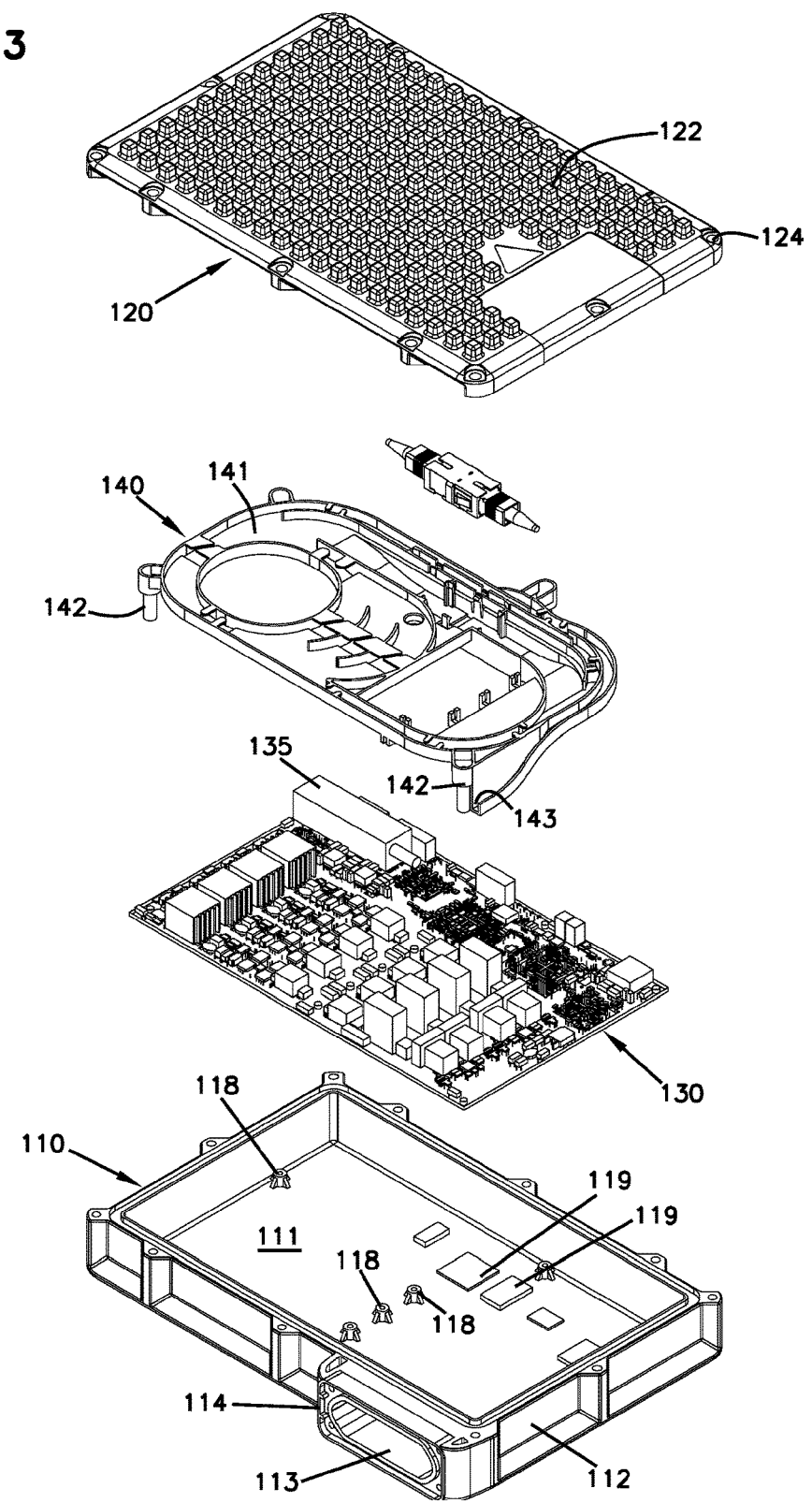
FIG. 3 is a perspective view of the closure of FIG. 1 with the various components of the closure exploded away from each other.

As shown in FIGS. 2 and 3, the closure 100 includes a base 110 and a cover 120 that cooperate to define the interior 107. The base 110 defines a port 113 at which the cable sub-assembly 160 is secured to the base 110. The electronic circuitry is disposed within the interior 107. For example, a circuit board 130 including the opto-electrical conversion electronics 135 is disposed within the interior 107. In certain implementations, a management tray 140 also can be disposed within the interior 107. The management tray 140 may be configured to inhibit contact between any optical fibers within the closure 100 and the heat-generating electronic circuitry of the circuit board 130.

The base 110 and/or cover 120 can be configured to disperse heat generated by the electronic circuitry. For example, the base 110 and/or cover 120 can be formed of a thermally conductive material (e.g., a metal). In an example, the base 110 and/or cover 120 can be formed of Al Die cast. In other examples, the base 110 and/or cover 120 can be formed of thermally conductive plastics.

In some implementations, the base 110 includes thermally conductive pads 119 (FIG. 3) disposed adjacent heat-generating components on the circuit board 130. In certain examples, the pads 119 are disposed at the bottom 111 of the base 110. In some examples, the thermally conductive pads 119 are formed of a material different form the base 110 that has enhanced cooling properties compared to the base 110. In other examples, the thermally conductive pads 119 are formed of the same material as the base 110, but are thicker. In an example, the thermally conductive pads 119 are sufficiently thick to touch the circuit board 130 or a heat-generating component thereon.

In certain implementations, an exterior surface of the base 110 and/or cover 120 can include cooling structures 122 (e.g., cooling fins). In some implementations, the cooling structures 122 include a plurality of parallel channels extending across the exterior surface. In other implementations, the cooling structures 122 include pyramids, frustro-conical shapes, or other raised or recessed shapes formed at the exterior surface. For example, the raised or recessed shapes increase the surface area of the exterior surface, which may aid in cooling the base 110 and/or cover 120.

Figure 4:
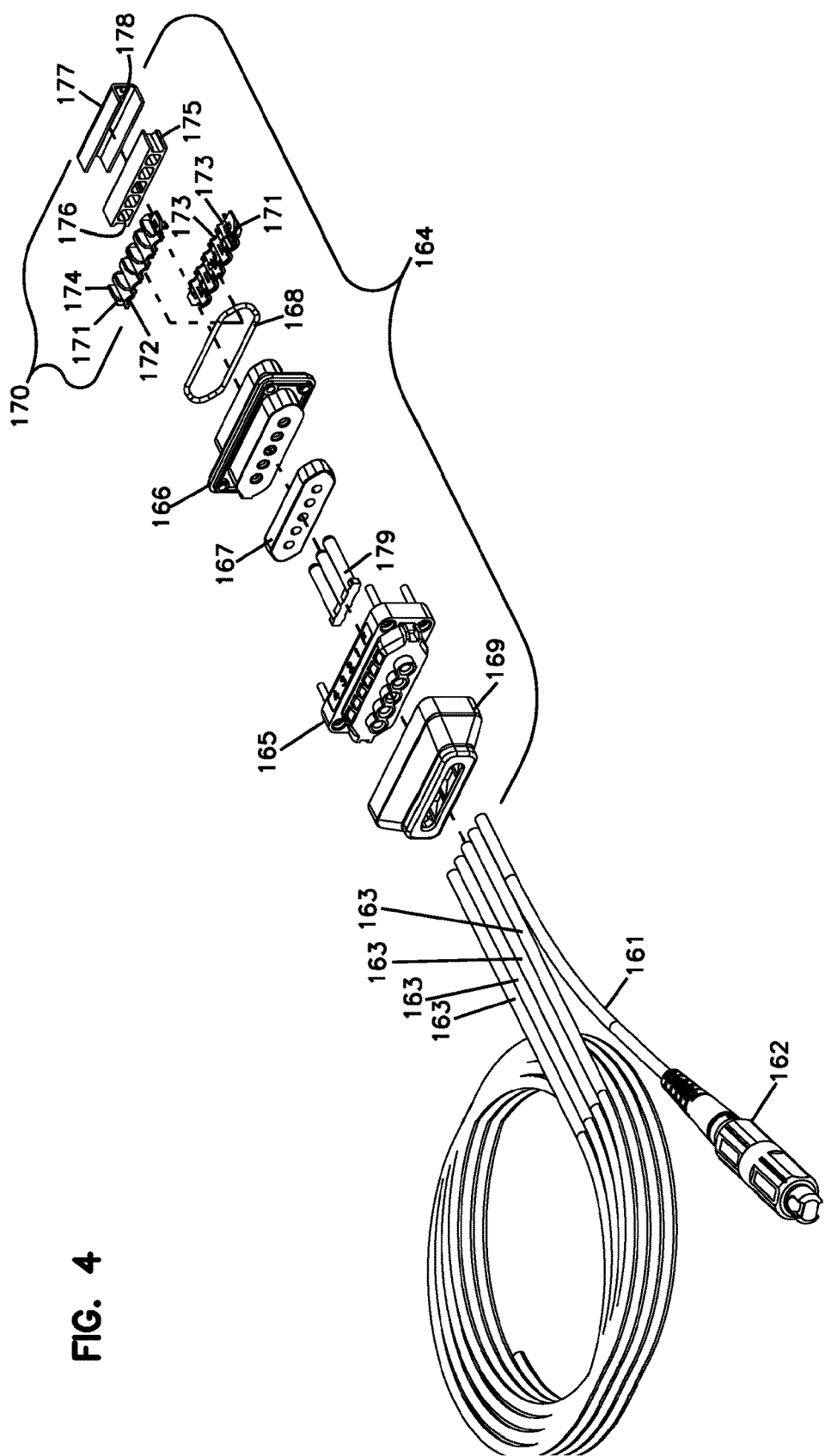
FIGS. 4 and 5 are perspective views of the cable sub-assembly with the various components of the sub-assembly exploded away from each other.
Figure 5:
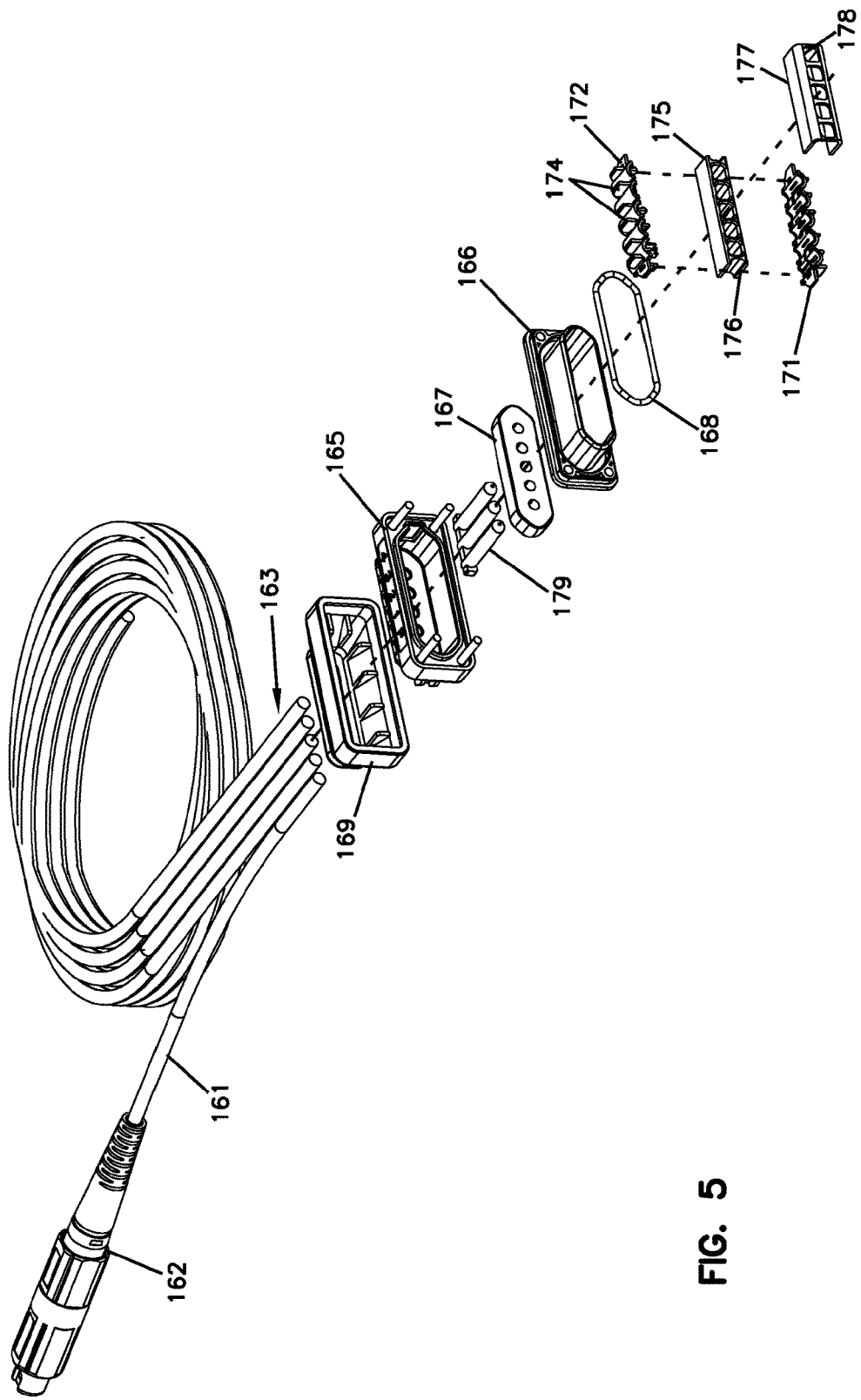

FIGS. 4 and 5 illustrate an example cable sub-assembly 160 suitable for use with the closure 100. The cable sub-assembly 160 is configured to secure to the closure to seal the port 113. The port 113 is sized to receive the optical fibers and electrical conductors of the cable sub-assembly 160. In certain examples, the port 113 is sized to receive a connectorized end of one or more optical fiber cables 161. The port 113 is configured to receive any of various types of cable sub-assemblies having different numbers and types of cables. For example, an example closure 100 can receive a cable sub-assembly 160 having an optical fiber cable and two electrical cables, a cable sub-assembly 160 having an optical fiber cable and four electrical cables, two optical fiber cables and two electrical cables, or any other desired cable configuration. In various examples, the optical fiber cables can be connectorized at both ends, one end, or neither end.

In the example shown in FIGS. 4 and 5, the cable sub-assembly 160 includes an optical fiber cable 161 extending from a first end to a second end. The first end is terminated at a fiber optic connector 162. The second end is configured to enter the closure 100 through the port 113. The cable sub-assembly 160 includes at least one electrical cable 163 extending between a first and a second end. The second end is configured to enter the closure 100 through the port 113. In the example shown, the cable sub-assembly 160 includes four electrical cables 163. In other examples, the cable sub-assembly 160 can include a greater or lesser number of electrical cables (e.g., two, three, six, eight, etc.). In certain examples, the first ends of the electrical cables 163 are unterminated.

A sealing arrangement can be mounted over the cables 161, 163. The sealing arrangement 164 is configured to provide an environmental seal between the closure interior 107 and the closure exterior at the port 113. For example, in some implementations, the sealing arrangement 164 carries an O-ring 168 that provides an environmental seal between the sealing arrangement 164 and the closure port 113. Accordingly, water, dirt, or other contaminants cannot pass between the sealing arrangement 164 and the port 113 to enter the closure interior 107. In other implementations, the sealing arrangement 164 may carry a different type of seal or may define a surface configured to engage a seal on the closure 100.

In certain implementations, the sealing arrangement 164 is configured to environmentally seal to the exterior surfaces of the optical and electrical cables 161, 163. For example, in some implementations, the sealing arrangement 164 includes a gasket 167 through which the cables 161, 163 extend to provide an environmental seal between the cables 161, 163 and the sealing arrangement 164. In various examples, the gasket 167 can be formed of rubber, gel, foam, or other sealing material. The gasket 167 inhibits water, dirt, or other contaminants from passing between the cables 161, 163 and the sealing arrangement 164 to enter the closure interior 107.

In certain implementations, the sealing arrangement 164 is configured to inhibit axial pullout of the cables 161, 163 from the closure 100. For example, outer jackets of the cables 161, 163 can be potted (e.g., with epoxy) or otherwise adhered to the sealing arrangement 164. In certain implementations, the jackets of the cables 161, 163 are terminated at the sealing arrangement 164 so that only bare optical fiber(s) 161 and electrical conductors 163a extend into the closure 100. In some such implementations, one or more of the cables 161, 163 are potted at the terminated jackets so that portions of the epoxy contact the bare fibers and/or conductors.

In certain implementations, the sealing arrangement 164 is configured to environmentally seal the interiors of one or more of the cables 161, 163 from the closure interior 107. For example, potting the cables where the jackets terminate may create a block between the interior of the cable jacket and an exterior of the cable jacket. Accordingly, water, dirt, or other contaminants cannot pass through the cables 161, 163 (e.g., within the jackets) to enter the closure interior 107. In certain implementations, water vapor also cannot penetrate the seal to enter the closure 100. In some implementations, the interiors of only the electrical cables 163 are sealed. In other implementations, the interior of only the optical fiber cable 161 is sealed. In still other implementations, the interiors of all of the cables 161, 163 are sealed. In certain implementations, desiccant can be disposed within the closure interior 107 to reduce humidity throughout the lifetime of the closure.

In the example shown, the sealing arrangement 164 includes a first clamping member 165 and a second clamping member 166 that are configured to retain the gasket 167 therebetween. In certain implementations, the first and second clamping members 165, 166 compress the gasket 167 to activate the seal. In certain implementations, the clamping members 165, 166 defines guide holes through which the cables 161, 163 can extend. In certain implementations, the clamping members 165, 166 are held together using fasteners. In certain implementations, the second clamping member 166 carries the O-ring 168.

In certain implementations, the sealing arrangement 164 includes a boot 169 that is mounted to the first clamping member 165 and extends from the first clamping member 165 away from the second clamping member 166. In certain examples, the boot 169 blocks access to the fasteners to inhibit uncoupling of the clamping members 165, 166. In certain examples, the boot 169 provides bend control for the cables 161, 163. In certain implementations, the sealing arrangement 164 is keyed to the closure in a particular rotational orientation.

In certain implementations, the sealing arrangement 164 includes a mechanical fixation arrangement 170 that axially fixes the jackets of the cables 161, 163. For example, the mechanical fixation arrangement 170 can include toothed members 171 to grip the cable jackets to axially fix the cables 161, 163 relative to the mechanical fixation arrangement 170. The mechanical fixation arrangement 170 also can include structure to axially fix the mechanical fixation arrangement 170 other parts of the sealing arrangement 164.

In the example shown, the mechanical fixation arrangement 170 includes first and second retention members 171 that each define channels 172. The first and second retention members 171 are positioned so that the channels 172 oppose each other to define passages for the cables 161, 163. The first and second retention members 171 include teeth 173 extending into the channels 172 to grip the jackets of one or more of the cables 161, 163. Gripping the jackets axially and rotationally fixes the cables 161, 163 relative to the retention members 171. In certain examples, the epoxy can be applied between the cable jackets and the channels 172 when potting the cables 161, 163. In certain implementations, strength members (e.g., aramid yarn) of the fiber cable 161 can be crimped, epoxied, or otherwise secured to the retention members 171. In other implementations, either type of cable 161, 163 can be axially fixed by heat-shrinking around the jacket, potting directly to the jacket, and/or crimping around peeled sections of the jacket.

The first and second retention members 171 also include fins 174 that extend outwardly away from the channels 172. In certain examples, the fins 174 engage a body of the sealing arrangement 164 (e.g., the second clamping member 166) to axially fix the retention members 171 relative to the sealing arrangement 164. In certain implementations, the fixation arrangement 170 also includes an alignment bar 175 that defines openings 176 through which the cables 161, 163 can pass. In certain examples, the alignment bar 175 aids in holding the retention members 171 at the sealing arrangement 164. In certain examples, the cable jackets are potted within the channels 176 of the alignment bar 175. A front piece 177 holds the alignment bar 175 to the sealing arrangement 164. The front piece 177 also defines openings 178 through which the optical fibers and electrical conductors can pass.

In certain implementations, one or more plugs 179 can be provided at the sealing arrangement 164 to seal openings through the sealing arrangement 164 when fewer cables 161, 163 are routed to the sealing arrangement 164. For example, the sealing arrangement 164 shown in FIGS. 4 and 5 is capable of receiving one optical fiber cable 161 and four electrical cables 163. If only one electrical cable 163 is received at the sealing arrangement 164, then the plugs 179 may seal the guide openings through the clamping members 165, 166 to environmentally seal the closure interior 107. Accordingly, port plugs need not be installed in the field to seal the closure 100 if less than the maximum number of cables is received at the closure 100.

Figure 6:
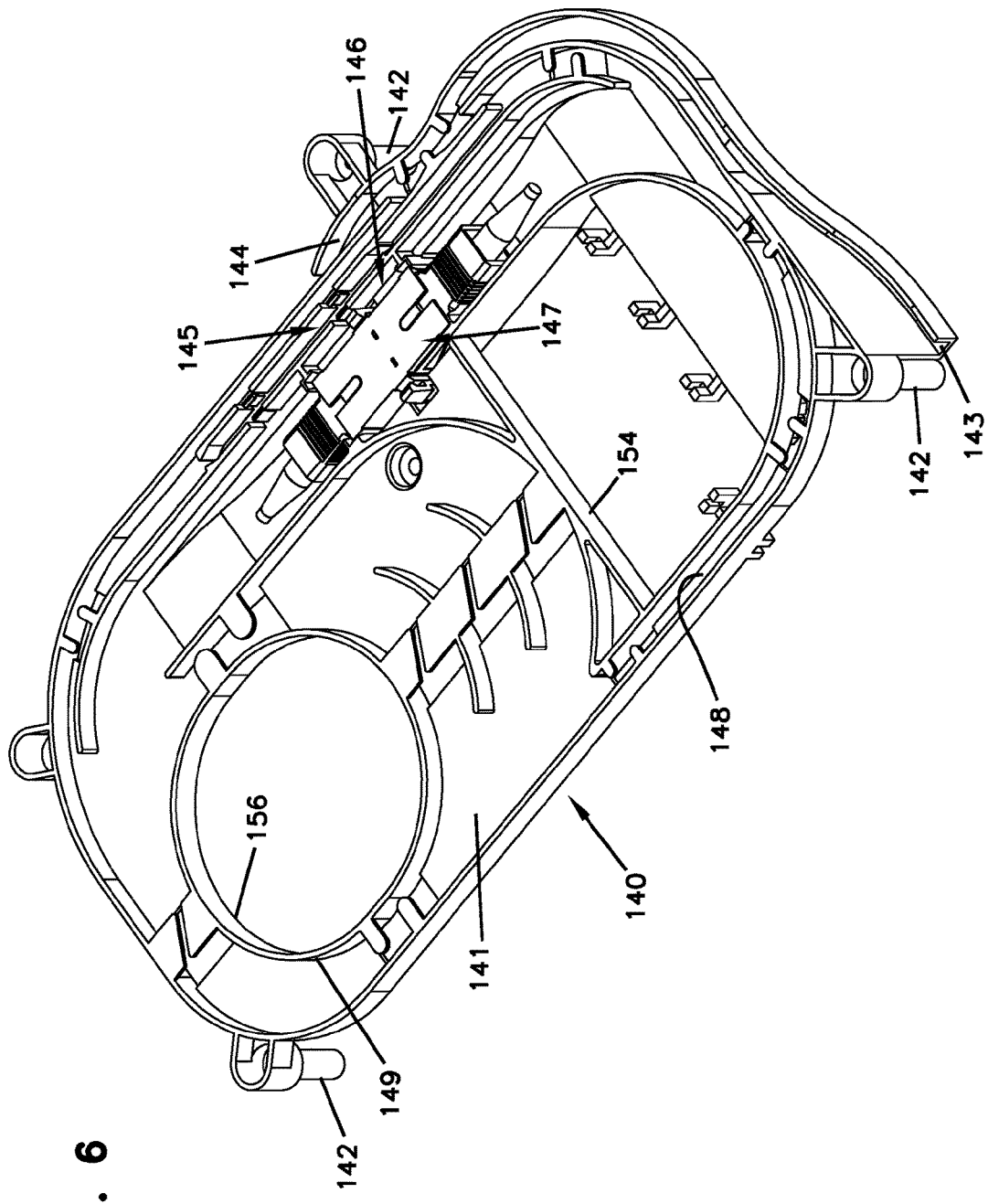
FIG. 6 is a top perspective view of an example management tray suitable for use in the closure of FIG. 1.
Figure 7:
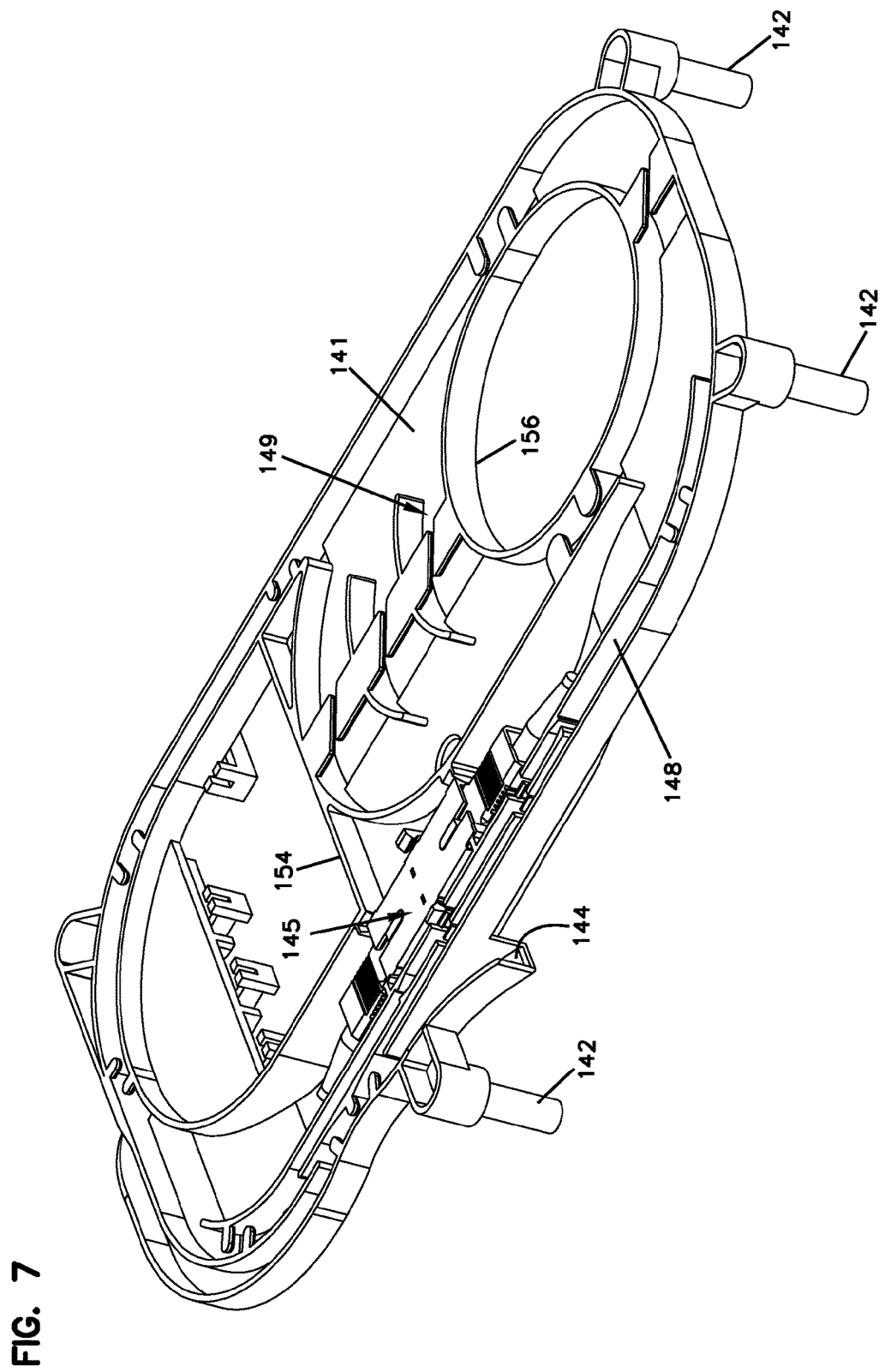
FIG. 7 is another perspective view of the management tray of FIG. 6 in which an exit guide is visible.
Figure 8:
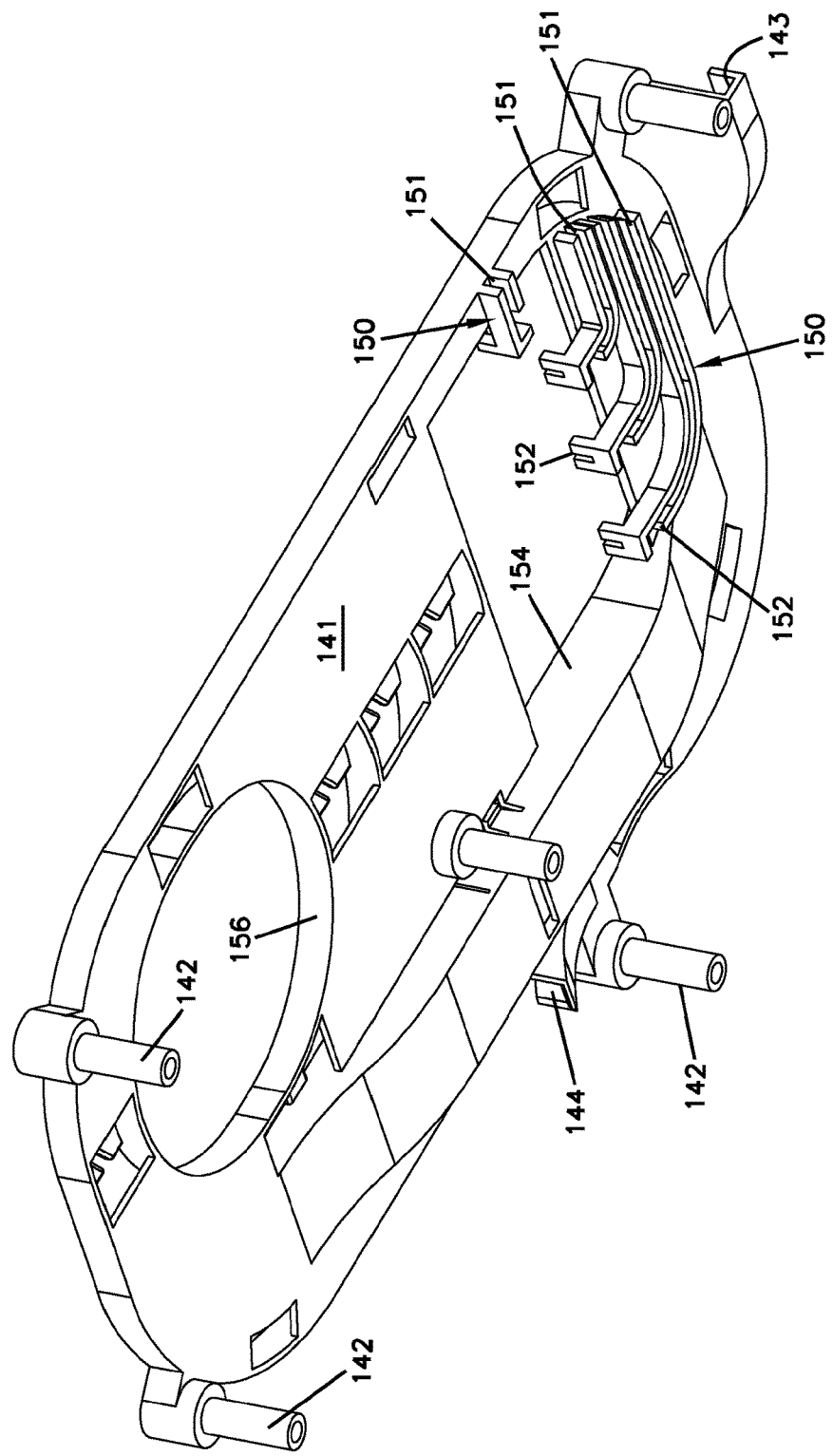
FIG. 8 is a bottom perspective view of the management tray of FIG. 6 in which guides for electrical conductors are visible.

FIGS. 6-8 illustrate an example management tray 140 configured to route an optical fiber from the cable sub-assembly 160 to the electronic components 135 of the circuit board 130. The management tray 140 includes a platform 141 coupled to one or more feet 142 at a peripheral edge of the platform 141. The feet 142 are configured to engage mounting structures 118 disposed within the base 110 to retain the mounting tray 140 within the base 110. The feet 142 are sufficiently high to elevate the platform 141 above the bottom 111 of the base 110 and over the circuit board 130 disposed between the tray platform 141 and the base bottom 111. Elevating the platform 141 over the circuit board 130 also enhances the internal airflow within the closure 100 to facilitate cooling of the electronic components of the circuit board 130.

In certain implementations, the management tray 140 is configured to facilitate guiding one or more optical fibers from the cable sub-assembly 160 to the electronic components 135 of the circuit board 130. For example, the tray 140 can include an entrance guide 143 that transitions the optical fiber(s) onto the tray platform 141. In certain examples, the entrance guide 143 ramps upwardly to guide the fiber(s) to a top of the platform 141. The tray 140 also can include an exit guide 144 that transitions the fiber towards the circuit board 130. In certain examples, the exit guide 144 ramps downwardly away from the platform 141. In certain examples, the exit guide 144 extends in a different direction from the entrance guide 143. In the example shown, the exit guide 144 extends transverse to the entrance guide 143.

The entrance guide 143 and exit guide 144 extend from an exterior of the tray 140 to a routing channel 148 defined along a periphery of the tray platform 141. The routing channel 148 connects the entrance and exit guides 143, 144 to a coupling region 145 and to a storage region 149. In some implementations, the coupling region 145 includes a splice region 146. In other implementations, the coupling region 145 includes a termination region 147. In still other implementations, the coupling region 145 includes a splice region 146 and a termination region 147. Cable routing paths through the various regions will be discussed in more detail herein with reference to FIGS. 9-14.

As shown in FIG. 8, the management tray 140 also is configured to facilitate guiding one or more electrical conductors 163a from the cable sub-assembly 160 to the electronic components 135 of the circuit board 130. For example, the tray 140 can include guides 150 that extend from first ends 151 at a periphery of the tray 140 to second ends 152 facing towards electronic components of the circuit board 130 (e.g., see FIG. 2). Routing the electrical conductors 163a through the guides 150 inhibits cross-talk between the conductors 163a.

In certain examples, the management tray 140 includes apertures that accommodate electronic components of the circuit board 130. For example, the apertures may enable the electronic components to extend upwardly through the management tray 140 so that the tray 140 can be mounted sufficiently close to the circuit board to allow the closure 100 to maintain a low profile while accommodating large electronic components on the circuit board 130. In the example shown, the management tray 140 defines a first aperture 154 at the second ends 152 of the guides 150 to accommodate electronic components to which the electrical conductors attach (see FIG. 2). In certain examples, the storage region 149 defines a second aperture 156 to accommodate the size of electronic components on the circuit board 130.

Figure 9:
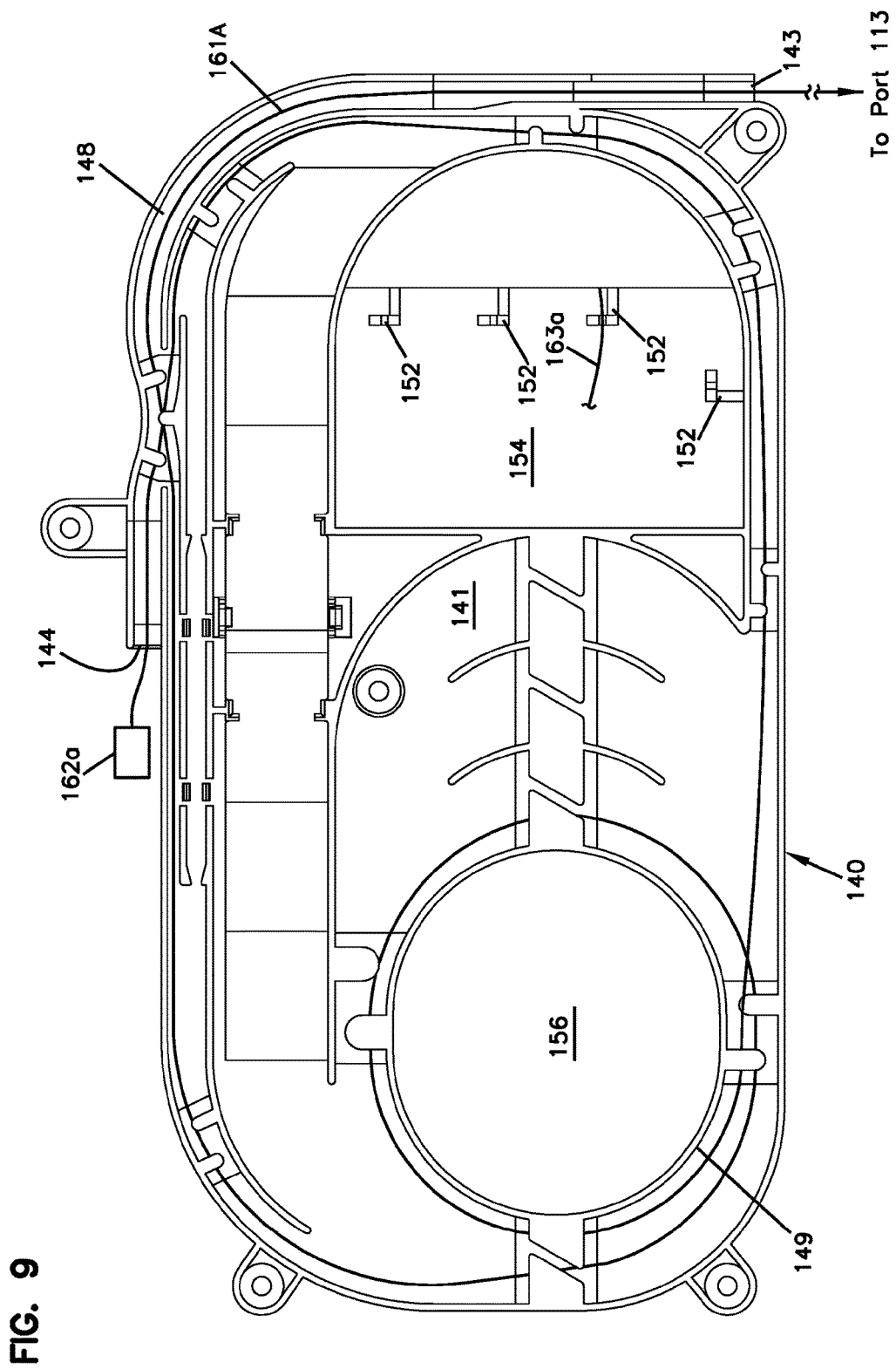
FIGS. 9-14 illustrate various cable routing paths that connect an optical fiber of the cable sub-assembly of FIG. 1 to optoelectronics within the closure of FIG. 1.

FIGS. 9-14 illustrate various cable routing schemes over the management tray 140. FIG. 9 illustrates an example cable routing path for routing a connectorized end 162a of an optical fiber 161a of the optical fiber cable 161 from port 113, onto the management tray 140, and towards the optoelectronics circuitry of the circuit board 130. The optical fiber 161a extends over the entrance guide 143 and into the routing channel 148 around the periphery of the platform 141. In some examples, the optical fiber 161a can extend directly to the exit guide 144 so that the connectorized end 162a is spaced from the tray 140 a sufficient distance to plug into the optoelectronics circuitry.

In other examples, the optical fiber 161a can extend through the routing channel 148 fully around the periphery of the platform 141 before extending to the exit guide 144 to manage excess length of the optical fiber 161a. In still other implementations, additional excess length of the optical fiber 161a can wrap (one or more times) around a storage spool at the storage region 149. In the example shown, the storage spool extends around the second aperture 156. Retention fingers and bend radius limiters can be disposed at the storage region 149 adjacent the storage spool.

In other implementations, a pigtail 181 is routed from the optoelectronics circuitry of the circuit board 130, onto the management tray 140, and to the coupling region 145. The optical fibers 161a of the optical fiber cable 161 also is routed onto the management tray 140 and to the coupling region 145 to be optically coupled to the pigtail 181. In some implementations, the pigtail 181 and optical fiber 161a can be connectorized and aligned at the termination section 147 of the tray 140. In other implementations, the pigtail 181 and the optical fiber 161a can be optically spliced (e.g., fusion spliced) at a splicing section 146 of the tray 140.

Figure 10:
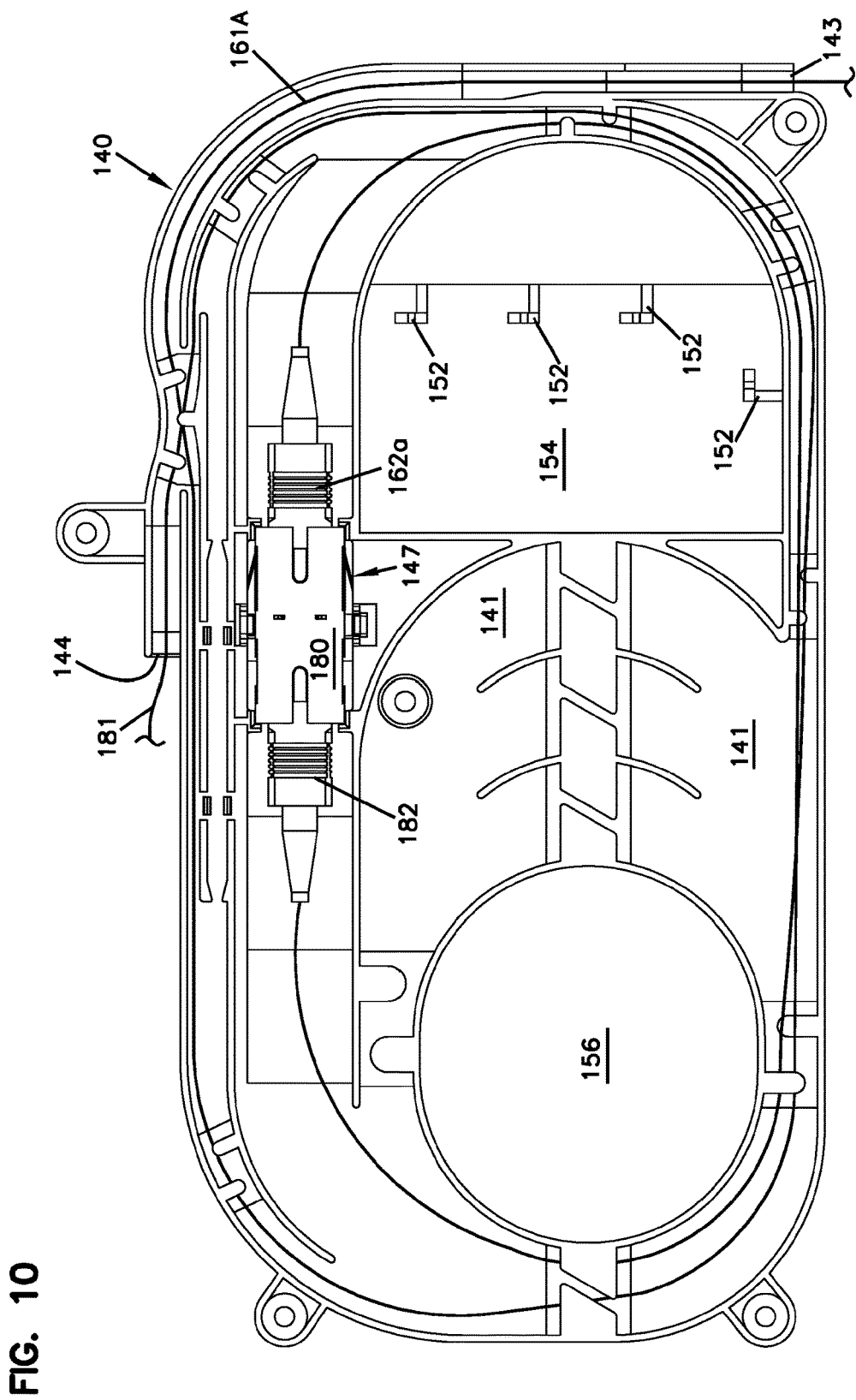

FIG. 10 illustrates an example cable routing path that includes the termination section 147 of the tray 140. An optical adapter 180 is disposed at the termination section 147. The optical fiber 161a of the optical fiber cable 161 is routed onto the tray platform 141 via the entrance guide 143 and extends along the routing channel 148. A connectorized end 162a of the optical fiber 161a plugs into a first port of the optical adapter 180. The pigtail 181 extends from the optoelectronics and onto the platform 141 via the exit guide 144. The pigtail 181 also extends along the routing channel 148 and a connectorized end 182 plugs into a second port of the optical adapter 180 in alignment with the connectorized end 162a of the optical fiber 161a. Accordingly, optical signals carried by the cable sub-assembly 160 can be received at the optoelectronics of the circuit board.

Figure 11:
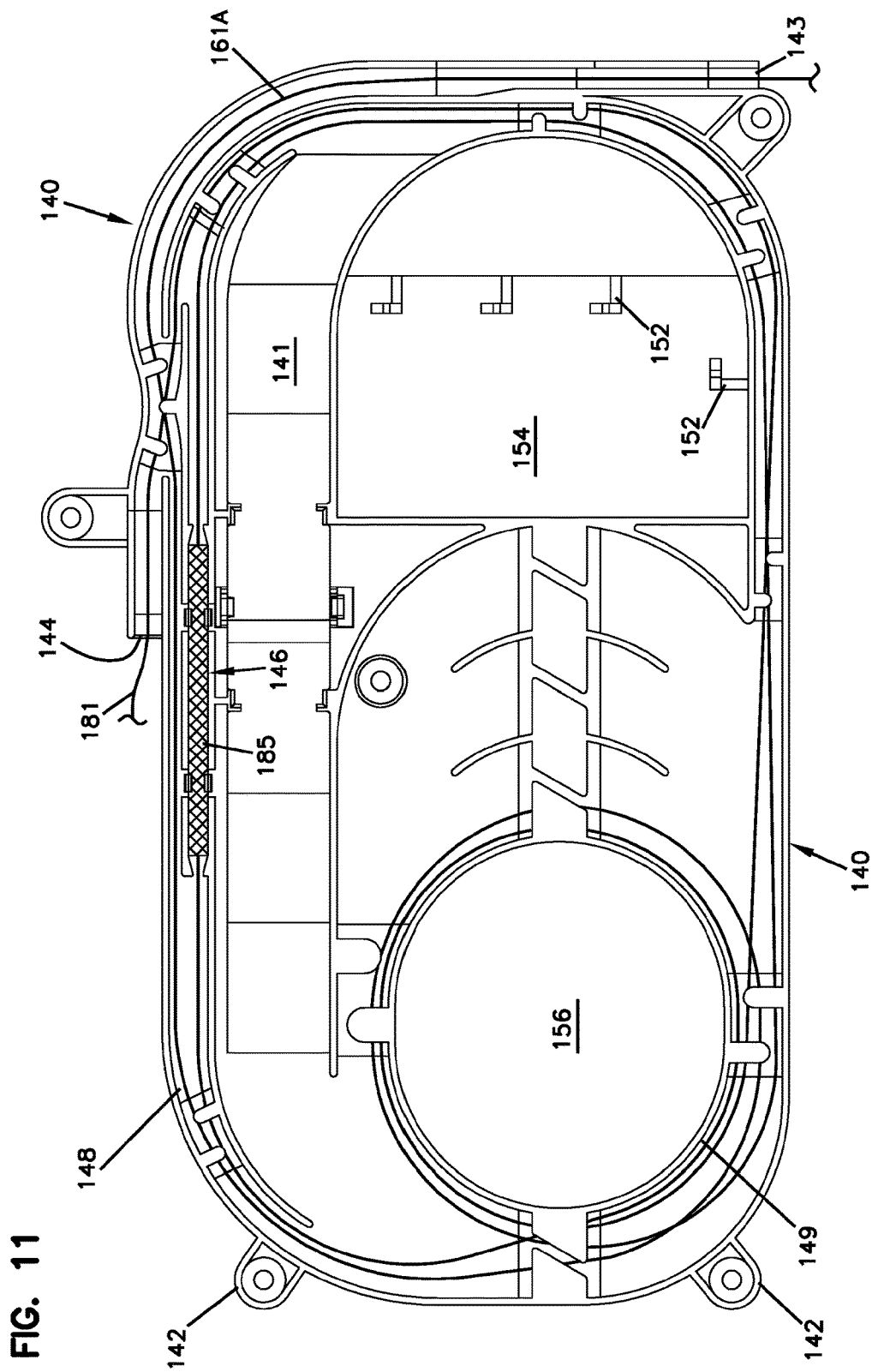

FIG. 11 illustrates an example cable routing path that includes the splicing section 146 of the tray 140. A splice holder 185 is disposed at the splicing section 146. The optical fiber 161a of the optical fiber cable 161 is routed onto the tray platform 141 via the entrance guide 143 and extends along the routing channel 148. Any excess length is taken up at the storage region 149 and an unterminated end of the optical fiber 161a is routed to the spicing section 146. The pigtail 181 extends from the optoelectronics, onto the platform 141 via the exit guide 144, along the routing channel 148 (and storage region 149), to the splicing region 146. The unterminated ends of the optical fibers 161a, 181 are spliced together (e.g., fusion spliced) at a splice point and the splice holder 185 is positioned to cover the splice point. Accordingly, optical signals carried by the cable sub-assembly 160 can be received at the optoelectronics of the circuit board.

Figure 12:
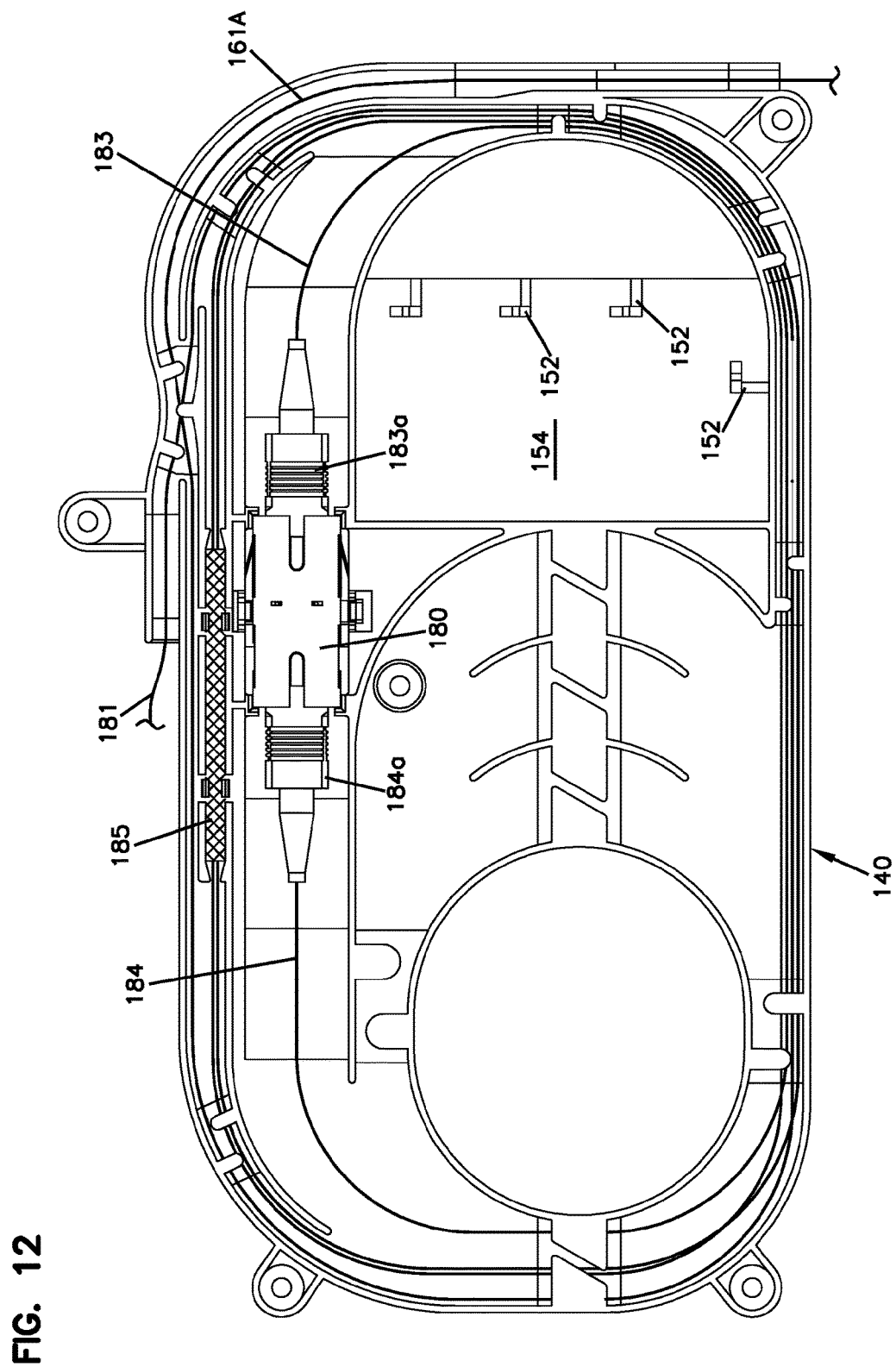
Figure 13:
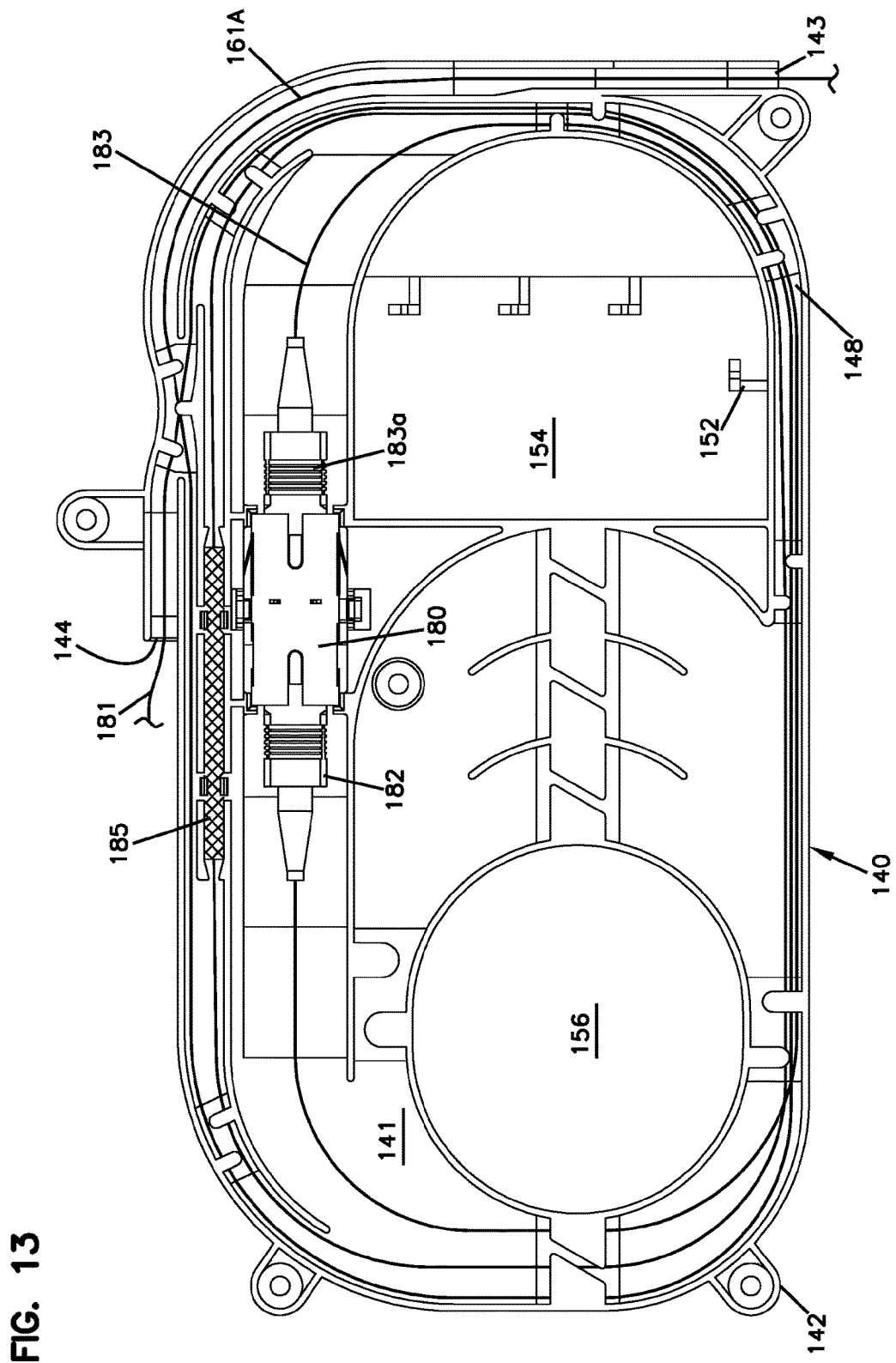
Figure 14:
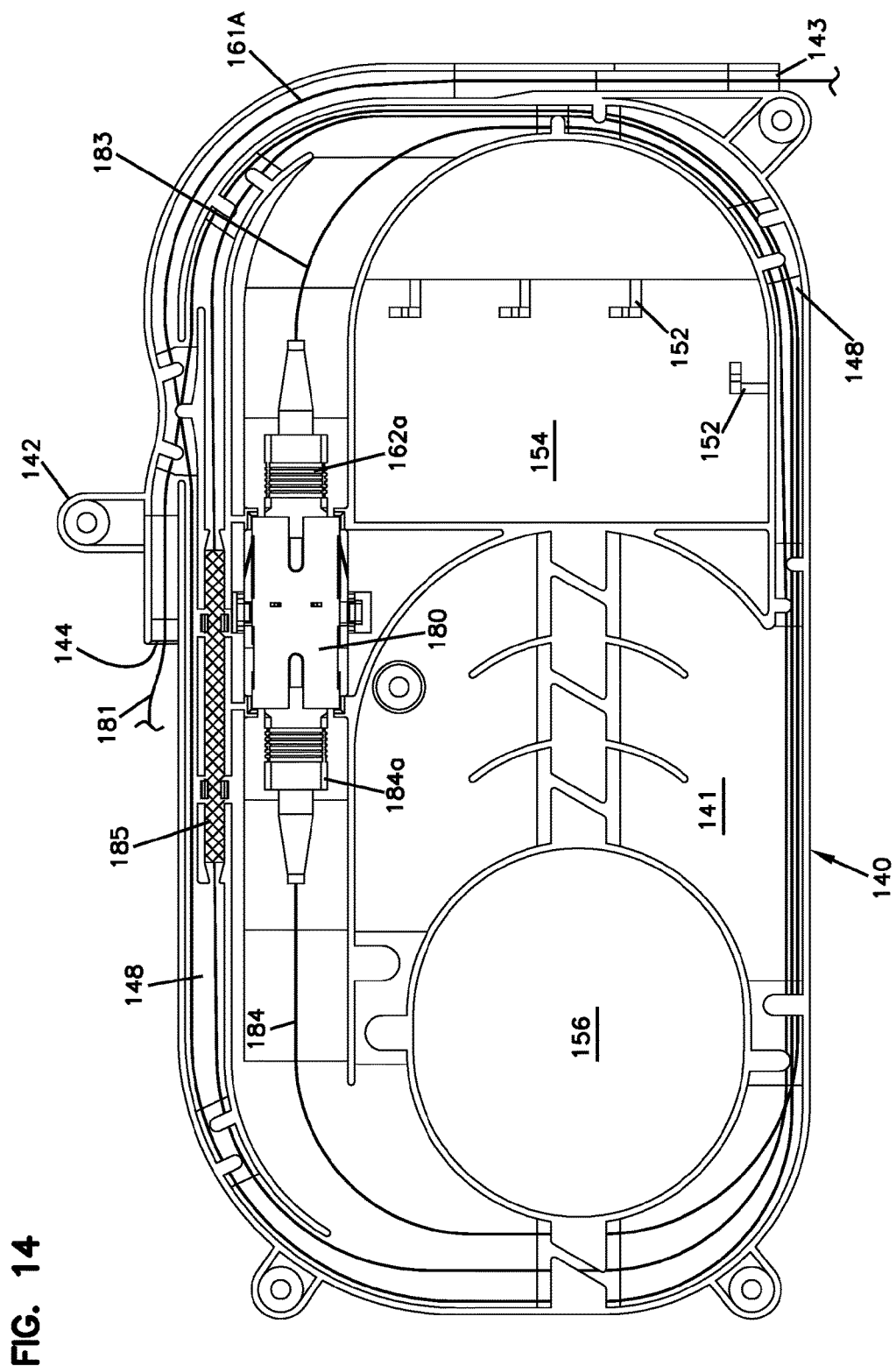

FIGS. 12-14 illustrate example cable routing paths that include both the splicing section 146 and the termination section 147 of the tray 140. In FIG. 12, the optical fiber 161a of the optical fiber cable 161 enters the platform 141 at the entrance guide 143, extends along the routing channel 148, to the splicing section 146. An unterminated end of the optical fiber 161a is spliced to a first intermediate pigtail 183 that is also routed along the routing channel 148 to the termination section 147. A connectorized end 183a of the first intermediate pigtail 183 plugs into the first port of a termination adapter 180. An optical fiber 181 extends from the optoelectronics of the circuit board, enters the platform 141 at the exit guide 144, and extends along the routing channel 148 to the splicing section 146. An unterminated end of the optical fiber 181 is spliced to a second intermediate pigtail 184 that is also routed along the routing channel 148 to the termination section 147. A connectorized end 184a of the pigtail 184 plugs into the second port of the termination adapter 180. Accordingly, optical signals carried by the cable sub-assembly 160 can be received at the optoelectronics of the circuit board.

In FIG. 13, only the optical fiber 161a of the cable sub-assembly 160 is spliced to an intermediate pigtail 183. The optical fiber 181 from the optoelectronics is connectorized (see 182) and plugged into the optical adapter 180 to align with the connectorized end 183a of the intermediate pigtail 183. In FIG. 14, only the optical fiber 181 from the optoelectronics is spliced to an intermediate pigtail 184. The optical fiber 161a of the cable sub-assembly 160 is connectorized and plugged into the optical adapter 180 to align with the connectorized end 184a of the intermediate pigtail 184.

In the example shown in FIGS. 1-14, the cable port 113 is defined along one of the sides 103 of the base 110. Positioning the closure along one of the longer sides 103, 104 (instead of one of the shorter ends 101, 102) reduces the overall length of the assembled closure 100. Accordingly, the assembled closure 100 (including the cable sub-assembly 160) can better fit within an enclosed space, such as a handhole. In other example implementations, however, the cable sub-assembly 160 can be positioned at the shorter sides or elsewhere on the base 110 or cover 120.

Figure 15:
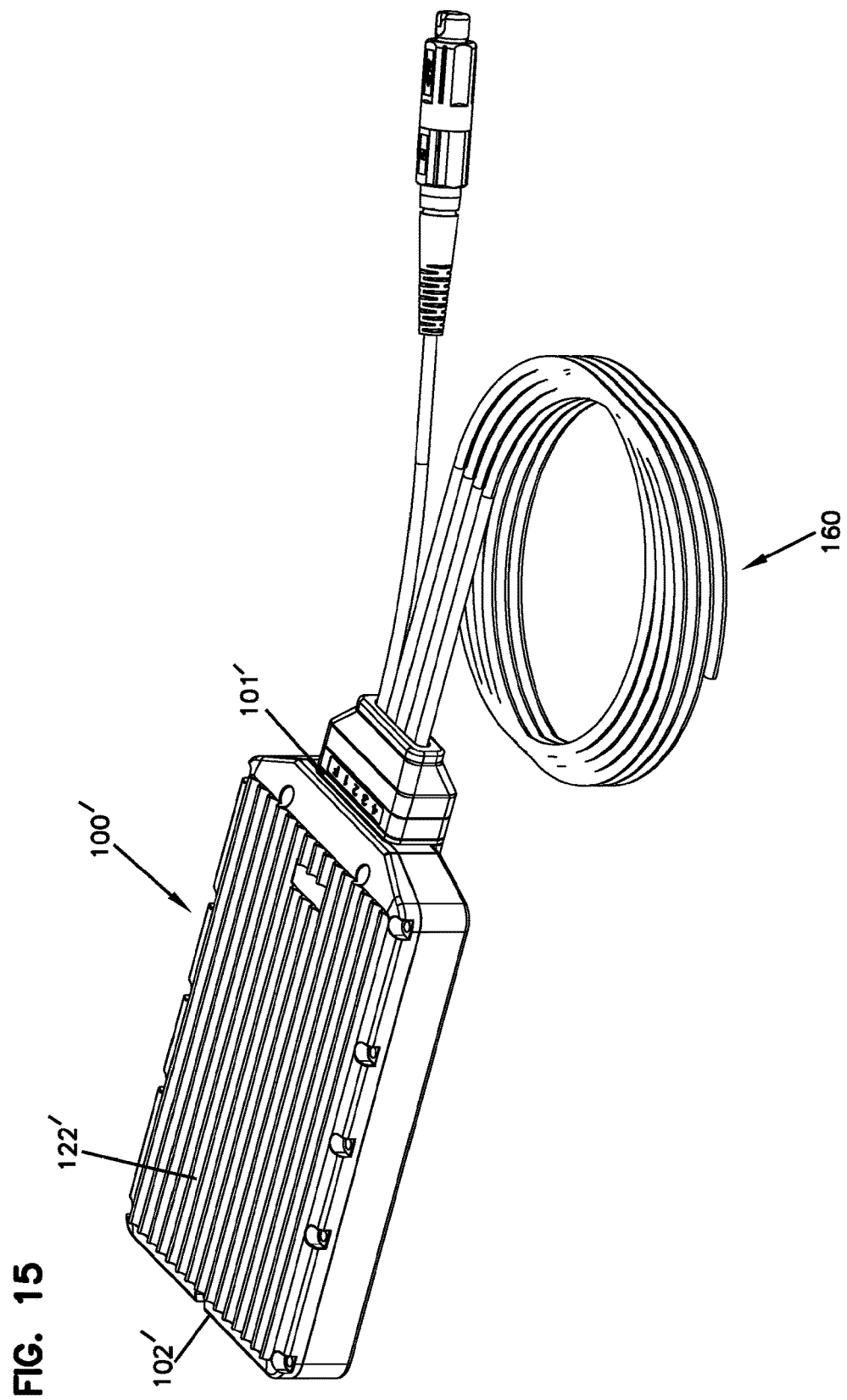
FIG. 15 is a perspective view of the cable sub-assembly received at another example closure configured in accordance with the principles of the present disclosure.

FIG. 15 illustrates an alternative closure 100' elongated between a first end 101' and a second end 102'. The closure 100' defines a port to receive the cable sub-assembly 160 at the first end 101' of the closure 100'. In certain implementations, the closure 100' tapers inwardly towards the port at the first end 101'. In certain implementations, the cooling structures 122' defined at an exterior of the closure 100' include fins elongated along a length of the closure 100'.

Figure 16:
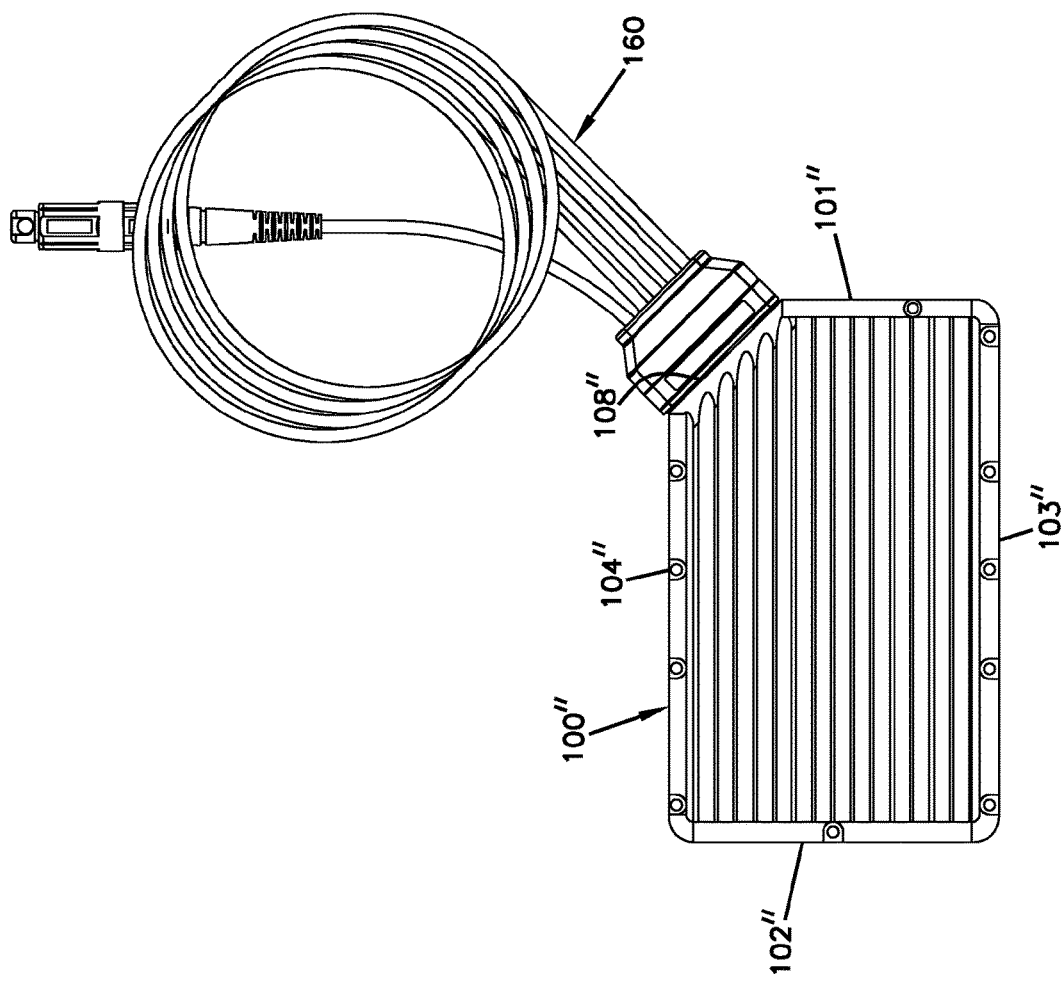
FIG. 16 is a perspective view of the cable sub-assembly received at another example closure configured in accordance with the principles of the present disclosure.

FIG. 16 illustrates another alternative closure 100" elongated between a first end 101" and a second end 102", which extend between first and second sides 103", 104". The closure 100" defines a port to receive the cable sub-assembly 160 at an angled corner 108" of the closure 100". In the example shown, the angled corner 108" extends between the first end 101" and the second side 104".

The above specification, examples and data provide a complete description of the manufacture and use of the composition of the invention. Since many embodiments of the invention can be made without departing from the spirit and scope of the invention, the invention resides in the claims hereinafter appended.

LIST OF REFERENCE NUMERALS AND CORRESPONDING FEATURES 100, 100', 100" closure
101, 101', 101" first end
102, 102', 102" second end
103, 103" first side
104, 104" second side
105 top
106 bottom
107 interior
108" angled corner
110 base
111 bottom
112 walls
113 port
114 securement structure
118 mounting structures
119 cooling pads
120 cover
122 cooling structures
124 fastening structures
130 circuit board
135 optoelectronic component
140 tray
141 platform
142 feet
143 entrance ramp
144 exit ramp
145 coupling region
146 splice region
147 termination region
148 routing channel
149 storage region
150 guides
151 guide entrance
152 guide exit
154 first aperture
156 second aperture
160 cable assembly
161 fiber cable
161a optical fiber
162 fiber optic connector
162 connectorized end
163 electrical cable
164 sealing arrangement
165 first clamping member
166 second clamping member
167 gasket
168 O-ring
169 boot
170 fixation arrangement
171 retention members
172 channels
173 teeth
174 fins
175 alignment bar
176 openings
177 front piece
178 openings
179 plug
180 optical adapter
181 optical fiber pigtail
182 connectorized end
183 first intermediate pigtail
184 second intermediate pigtail
185 splice holder
L Length
W Width
H Height

What is claimed is:

1. A closure for optoelectronic circuitry comprising:
   a base having a sidewall extending upwardly from a bottom, the sidewall defining a cable port;
   cooling pads disposed at the bottom of the base;
   a cover that attaches to the base to close an interior of the closure;
   a circuit board disposed within the interior of the closure, the circuit board including the optoelectronic circuitry; and
   a management tray coupled to the base, the management tray including a platform disposed between the circuit board and the cover, the management tray including a fiber coupling region and a fiber storage region.

2. The closure of claim 1, further comprising a cable sub-assembly configured to be sealingly coupled to the closure at the cable port, the cable sub-assembly including an optical fiber cable and an electrical cable.

3. The closure of claim 2, wherein the cable sub-assembly includes a plurality of electrical cables.

4. The closure of claim 2, wherein the cable sub-assembly includes:
   an optical fiber cable including an optical fiber within a jacket, the optical fiber cable extending between a first end and a second end;
   a plurality of electrical cables including twisted pair conductors within jackets, the electrical cables extending between first and second ends; and
   a sealing arrangement disposed at an intermediate location along the cables, the sealing arrangement including a body and a gasket that seals between the jackets of the cables and the body, the sealing arrangement also being configured to seal to a closure at a port defined by the closure, the sealing arrangement also being configured to seal an interior of at least one of the cables.

5. The closure of claim 4, wherein the body of the sealing arrangement includes a first clamping member and a second clamping member between which the gasket is disposed.

6. The closure of claim 5, wherein the second clamping member carries an external O-ring.

7. The closure of claim 5, wherein the first and second clamping members are fastened together.

8. The closure of claim 5, wherein the sealing arrangement also includes a boot that provides bend control for the cables.

9. The closure of claim 1, further comprising cooling structures disposed on at least one of the base and the cover.

10. The closure of claim 9, wherein the cooling structures are disposed on both the base and the cover.

11. The closure of claim 9, wherein the cooling structures include elongated fins.

12. The closure of claim 9, wherein the cooling structures include raised square structures.

13. The closure of claim 9, wherein the cooling structures include raised pyramids.

14. The closure of claim 1, wherein the management tray includes a guide entrance that faces in a different direction from a guide exit.

15. The closure of claim 1, wherein the management tray includes guides sized to enable electrical conductors to be routed therethrough.

16. The closure of claim 15, wherein the guides are disposed at an opposite major surface of the management tray from the coupling region and storage region.

17. The closure of claim 1, further comprising an optical adapter disposed at the coupling region of the management tray.

18. The closure of claim 1, wherein the coupling region also is configured to receive and retain a splice holder.

19. The closure of claim 1, wherein the platform defines apertures sized to accommodate components on the circuit board.

20. A cable sub-assembly comprising:
   an optical fiber cable including an optical fiber within a jacket, the optical fiber cable extending between a first end and a second end;
   a plurality of electrical cables including twisted pair conductors within jackets, the electrical cables extending between first and second ends; and
   a sealing arrangement disposed at an intermediate location along the cables, the sealing arrangement including a body and a gasket that seals between the jackets of the cables and the body, the sealing arrangement also being configured to seal to a closure at a port defined by the closure, the sealing arrangement also being configured to seal an interior of at least one of the cables, wherein the body of the sealing arrangement includes a first clamping member and a second clamping member between which the gasket is disposed, wherein the first and second clamping members are fastened together.

21. The cable sub-assembly of claim 20, wherein the second clamping member carries an external O-ring.

22. The cable sub-assembly of claim 20, wherein the sealing arrangement also includes a boot that provides bend control for the cables.

23. A closure for optoelectronic circuitry comprising:
   a base having a sidewall extending upwardly from a bottom, the sidewall defining a cable port;
   cooling pads disposed at the bottom of the base;
   a cover attached to the base to close an interior of the closure;
   a circuit board disposed within the interior of the closure, the circuit board including the optoelectronic circuitry; and
   a cable sub-assembly configured to be sealingly coupled to the closure at the cable port, the cable sub-assembly including:
   (a) an optical fiber cable and an electrical cable;
      (i) the optical fiber cable including an optical fiber within a jacket, the optical fiber cable extending between a first end and a second end;
   (b) a plurality of electrical cables including twisted pair conductors within jackets, the electrical cables extending between first and second ends; and
   (c) a sealing arrangement disposed at an intermediate location along the cables, the sealing arrangement including a body and a gasket that seals between the jackets of the cables and the body, the sealing arrangement also being configured to seal to a closure at a port defined by the closure, the sealing arrangement also being configured to seal an interior of at least one of the cables.

24. The closure of claim 23, wherein the body of the sealing arrangement includes a first clamping member and a second clamping member between which the gasket is disposed.

25. The closure of claim 24, wherein the second clamping member carries an external O-ring.

26. The closure of claim 24, wherein the first and second clamping members are fastened together.

27. The closure of claim 24, wherein the sealing arrangement also includes a boot that provides bend control for the cables.

* * * * *